(No Model.)
T. MAYBRICK & W. J. ASHWORTH.
SAFETY BRAKE FOR ELEVATORS.
No. 526,931. Patented Oct. 2, 1894.
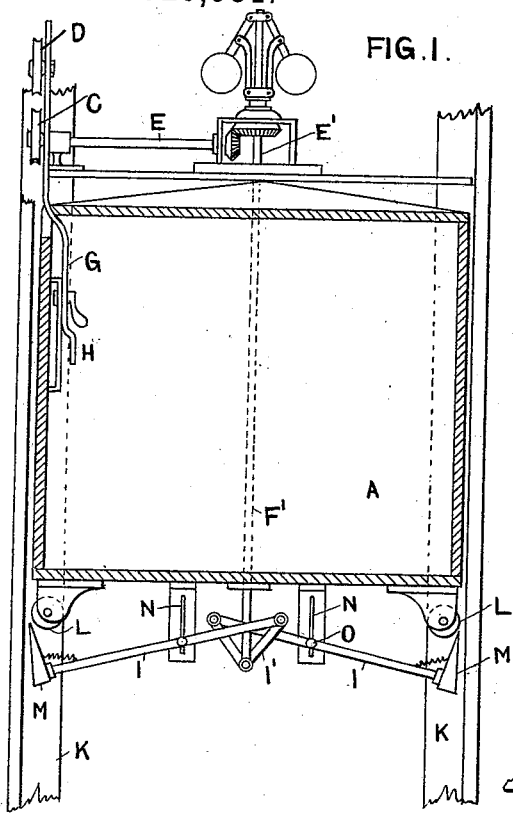
FIG. 1.
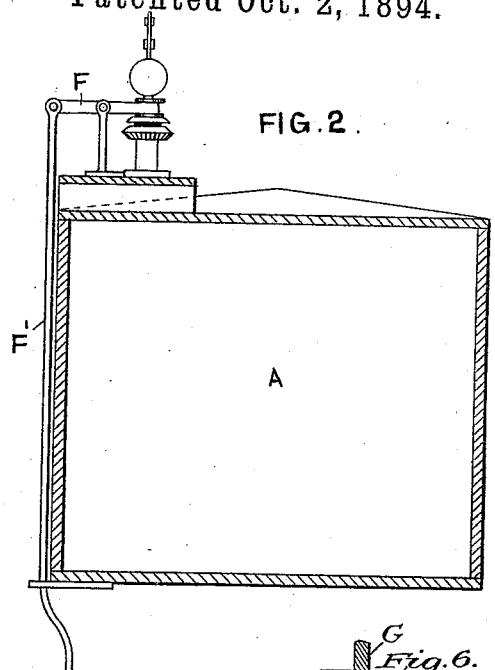
FIG. 2.
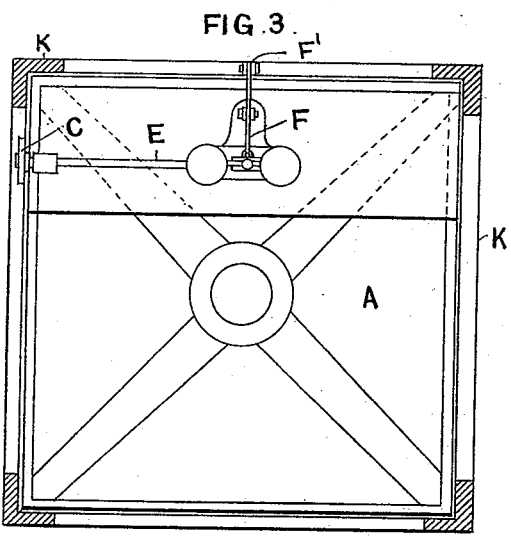
FIG. 3.
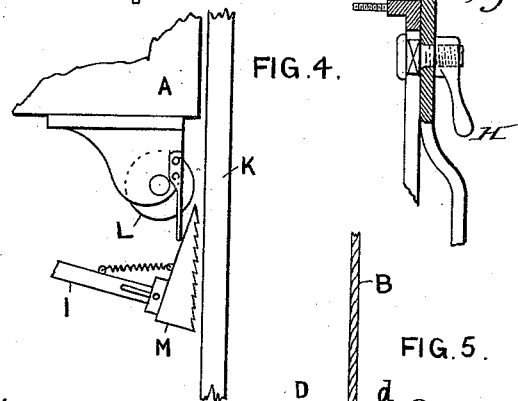
FIG. 4.
FIG. 5.
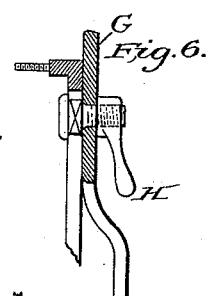
Fig. 6.
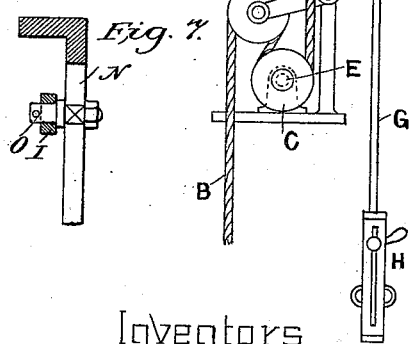
Fig. 7.
Witnesses
N. R. Kennedy
F. S. Elmore
Inventors
Thomas Maybrick
W. J. Ashworth
By P. T. Dodge Atty

UNITED STATES PATENT OFFICE.

THOMAS MAYBRICK AND WILLIAM JAMES ASHWORTH, OF MANCHESTER, ENGLAND.

SAFETY-BRAKE FOR ELEVATORS.

SPECIFICATION forming part of Letters Patent No. 526,931, dated October 2, 1894.

Application filed April 21, 1894. Serial No. 508,519. (No model.)

*To all whom it may concern:*

Be it known that we, THOMAS MAYBRICK and WILLIAM JAMES ASHWORTH, subjects of the Queen of Great Britain, residing at Manchester, in the county of Lancaster, in the Kingdom of England, have invented certain new and useful Improvements in Safety-Brakes for Elevators, of which the following is a specification.

This invention has for its object an improved brake or safety apparatus for automatically arresting the descent of colliery cages, lifts, hoists, elevators or the like on breaking of the rope or cable or other accident to the hoisting machinery.

The principal point in this invention consists in using a brake or wedge for stopping the descent of the cage controlled by a governor so that if the rope or cable break or the cage descends too rapidly, the governor balls will fly out and bring the wedge in contact with the guides and with an abutment on the case, when the friction of the wedge on the guide forces the wedge in between the guide and abutment and stops the cage. This can be done in a variety of ways, but the plan we prefer is set forth in the accompanying drawings, in which—

Figures 1 and 2 are sectional elevations taken at right angles with each other; Fig. 3—, a plan with part removed; Figs. 4— and 5—, details of machinery; Fig. 6—, a section of locking device H; Fig. 7—, a section of adjustable pivot O.

In the figures A is the cage, B a stationary rope or band in proximity to the path of the cage, which passing over suitable pulleys C and D drives the governor by frictional contact when the cage is in motion. One of these pulleys C is fixed on the end of the shaft E which is geared to the governor shaft E' and the other D (an adjustable one adapted to take up the slack in the rope or band) is carried by one end of a pivoted lever d, the other end of the lever being preferably provided with a rod G extending downward into the cage A, where it is provided with a suitable locking gear H so that the pulley D can be adjusted at pleasure to impart the required tension to the rope or band B.

To the governor spindle or a sliding collar thereon is connected, by lever F and rod F' and links I', one end of each of lever arms I whose vertical oscillations, when the governor balls rise or fall, are communicated to a wedge or wedges M carried by the free ends of said levers I underneath the cage and in close proximity to the framework or fixed guides K of the hoist.

The pivots O of lever arms I are adjustable in slotted guides N.

The mode of action is as follows:—As the cage is raised or lowered, the fixed cord or band passing round the aforesaid pulleys actuates the governor, and, if the rope breaks or the speed of the cage is suddenly increased, the circle of revolution of the balls widens as the speed of the cage increases, thus actuating the governor spindle or collar thereon and forcing the wedges between the cage and the guides, or against the guides, thus bringing the cage to a standstill. Rollers L are preferably attached to the bottom of the cage where the wedging takes place.

It will be obvious that, in place of wedges, any suitable brake device may be employed, also that the governor can be of any ordinary type, even the hydraulic, but we prefer the ordinary ball governor normally held to the off brake position by the weight of the balls, or, if horizontal, by a spring counter weighted or its equivalent.

Having thus described our invention what we claim in braking apparatus for hoists, is—

1. The combination of the fixed vertical guide, the hoist guided thereby, a governor geared to be driven at a speed relative to that of the hoist, a wedge arranged and adapted to enter between the hoist and its fixed guide, and a lever connection between the governor and the wedge for throwing the latter into action when the hoist is moving at abnormal speed.

2. The combination of the fixed vertical guide, the hoist guided thereby, a governor geared to be driven at a speed relative to that of the hoist, a wedge arranged and adapted to enter between the hoist and its fixed guide, a lever for actuating said wedge actively connected with the governor, and having an adjustable pivot or fulcrum whereby the extent of movement necessary to throw the wedge into action may be varied and regulated.

3. The combination of a hoist, a governor, gearing, and connections for driving the governor at a variable rate of speed according to the speed of the hoist, connections F F' I', and I, wedges M, and guides K with adjustable pivots O and slotted guides N, substantially as and for the purpose described.

In testimony whereof we have signed our names to this specification in the presence of two subscribing witnesses.

THS. MAYBRICK.
WILLIAM JAMES ASHWORTH.

Witnesses:
GEO. WM. FOX,
HAROLD WORSLEY.